US012811429B2

(12) United States Patent
Choi et al.

(10) Patent No.: US 12,811,429 B2
(45) Date of Patent: Nov. 24, 2026

(54) POWER CONTROL DEVICE AND BATTERY SYSTEM INCLUDING THE SAME

(71) Applicant: LG ENERGY SOLUTION, LTD., Seoul (KR)

(72) Inventors: Hobeen Choi, Daejeon (KR); Youngmin Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 732 days.

(21) Appl. No.: 18/277,938

(22) PCT Filed: Aug. 18, 2022

(86) PCT No.: PCT/KR2022/012315
§ 371 (c)(1),
(2) Date: Aug. 18, 2023

(87) PCT Pub. No.: WO2023/038317
PCT Pub. Date: Mar. 16, 2023

(65) Prior Publication Data

US 2024/0313567 A1 Sep. 19, 2024

(30) Foreign Application Priority Data

Sep. 10, 2021 (KR) ........................ 10-2021-0120957

(51) Int. Cl.
*H02J 7/96* (2026.01)
*H01M 10/42* (2006.01)
(Continued)

(52) U.S. Cl.
CPC ............. *H02J 7/96* (2026.01); *H01M 10/425* (2013.01); *H01M 10/482* (2013.01); *H02J 7/50* (2026.01);
(Continued)

(58) Field of Classification Search
CPC ..................................... H02J 7/96; H02J 7/63
(Continued)

(56) References Cited

U.S. PATENT DOCUMENTS

2004/0239293 A1 12/2004 Mori et al.
2007/0126407 A1* 6/2007 Loong ....................... G05F 5/00 323/210
(Continued)

FOREIGN PATENT DOCUMENTS

CN 101432942 A 5/2009
CN 106160175 A 11/2016
(Continued)

OTHER PUBLICATIONS

International Search Report for PCT/KR2022/012315 (PCT/ISA/210) mailed on Dec. 2, 2022.
(Continued)

*Primary Examiner* — Ahmed H Omar
(74) *Attorney, Agent, or Firm* — Birch, Stewart, Kolasch & Birch, LLP

(57) ABSTRACT

A battery system can include a battery pack that includes a plurality of battery cells connected in series, a battery management system that measures the voltage of each of the plurality of battery cells, and controls charging and discharging of the battery pack, a power converter that generates a DC voltage using a voltage of a positive electrode of the battery pack, a power supply unit that generates a power voltage using the voltage of the positive electrode, a regulator that supplies a drive voltage to the battery management system using the DC voltage, and a power control unit that enables the power converter using the power voltage when it is connected to the power supply unit in an undervoltage-lockout state of the power converter.

11 Claims, 2 Drawing Sheets

(51) Int. Cl.

| | |
|---|---|
| ***H01M 10/48*** | (2006.01) |
| ***H02J 7/50*** | (2026.01) |
| ***H02J 7/63*** | (2026.01) |
| ***H02J 7/80*** | (2026.01) |

(52) U.S. Cl.
CPC .................................... *H02J 7/63* (2026.01); *H02J 7/80* (2026.01); *H01M 2010/4271* (2013.01); *H01M 2220/20* (2013.01); *H02J 2207/20* (2020.01)

(58) Field of Classification Search
USPC .................................................. 320/118, 124
See application file for complete search history.

(56) References Cited

U.S. PATENT DOCUMENTS

| | | | | |
|---|---|---|---|---|
| 2007/0210758 | A1* | 9/2007 | Gangstoe .................. | H02J 7/62 320/134 |
| 2011/0163723 | A1* | 7/2011 | Tan ........................... | H02J 7/60 429/7 |
| 2014/0056738 | A1 | 2/2014 | Takahashi | |
| 2016/0014700 | A1 | 1/2016 | Taha et al. | |
| 2018/0062150 | A1 | 3/2018 | Kim | |
| 2018/0208066 | A1* | 7/2018 | Rao ........................... | B60L 3/00 |
| 2018/0253137 | A1 | 9/2018 | Cho et al. | |
| 2020/0052346 | A1* | 2/2020 | Park .................... | H01M 10/425 |

FOREIGN PATENT DOCUMENTS

| | | | |
|---|---|---|---|
| EP | 4016789 | A1 | 6/2022 |
| JP | 2004-312789 | A | 11/2004 |
| JP | 2007-104867 | A | 4/2007 |
| JP | 2010-81702 | A | 4/2010 |
| JP | 2010-162656 | A | 7/2010 |
| JP | 2014-45538 | A | 3/2014 |
| KR | 10-1439233 | B1 | 9/2014 |
| KR | 10-2015-0022110 | A | 3/2015 |
| KR | 10-2017-0069375 | A | 6/2017 |
| KR | 10-2018-0022162 | A | 3/2018 |
| KR | 10-1927124 | B1 | 12/2018 |
| KR | 10-1989492 | B1 | 6/2019 |
| KR | 10-2015009 | B1 | 8/2019 |
| KR | 10-2020-0017779 | A | 2/2020 |
| KR | 10-2020-0028194 | A | 3/2020 |
| KR | 10-2256601 | B1 | 6/2021 |
| KR | 10-2021-0087816 | A | 7/2021 |

OTHER PUBLICATIONS

Extended European Search Report for European Application No. 22867586.4, dated Oct. 2, 2025.

* cited by examiner

【Figure 1】
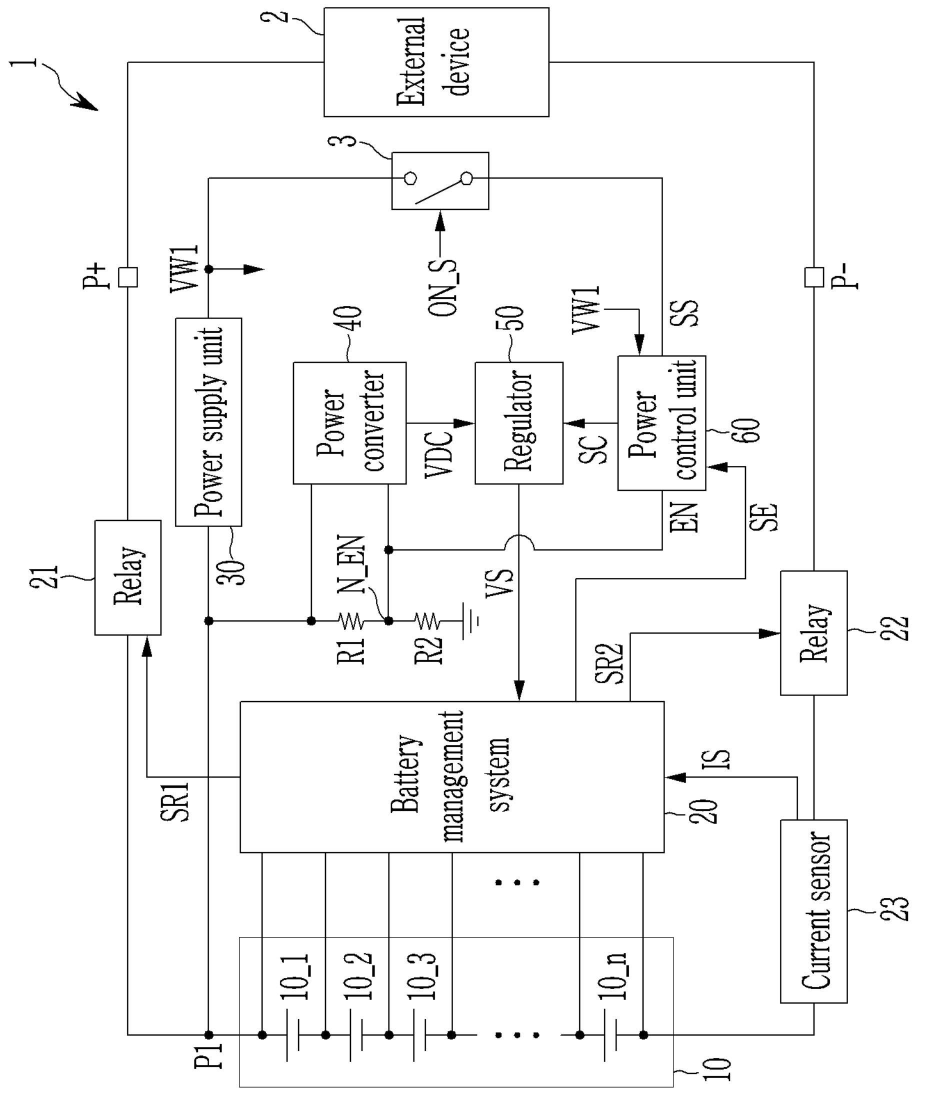

【Figure 2】
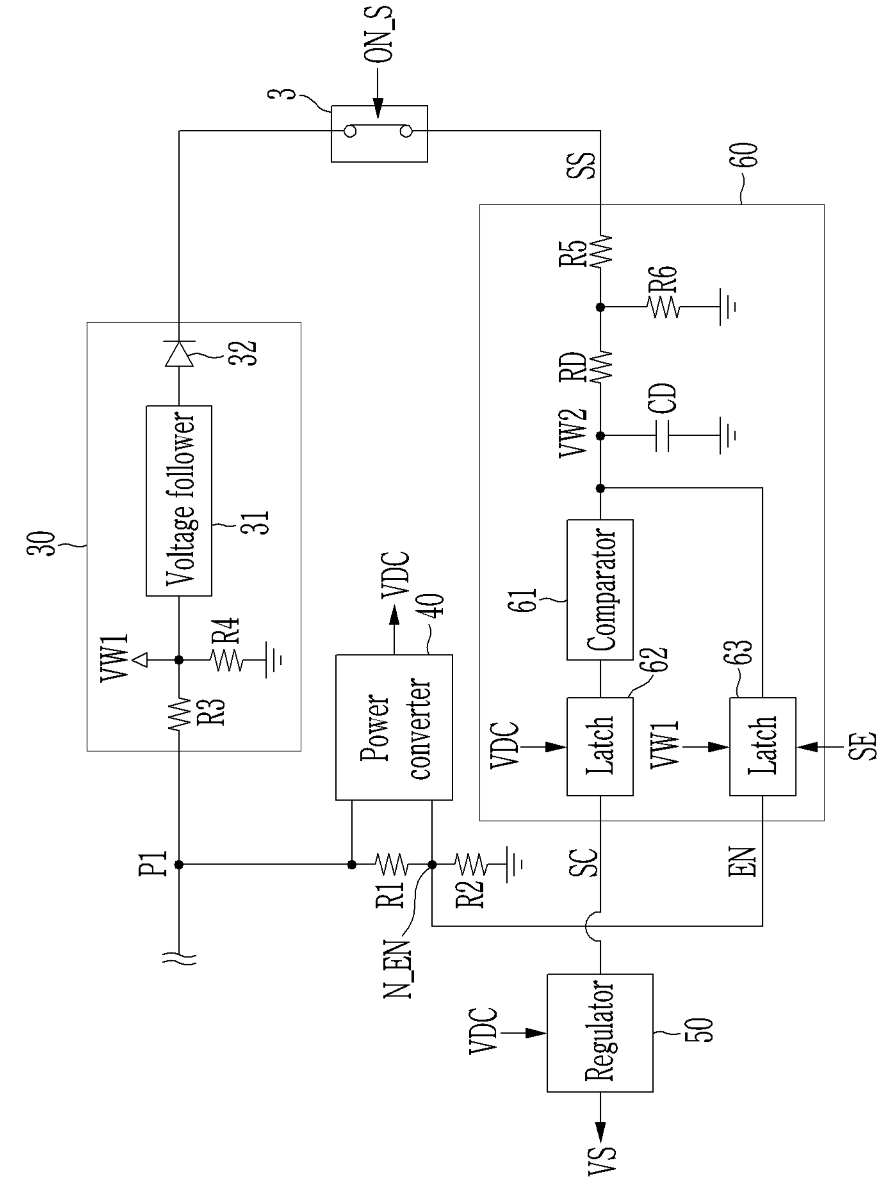

POWER CONTROL DEVICE AND BATTERY SYSTEM INCLUDING THE SAME

CROSS-REFERENCE TO RELATED APPLICATION

This application claims priority to and the benefit of Korean Patent Application No. 10-2021-0120957 filed in the Korean Intellectual Property Office on Sep. 10, 2021, the entire contents of which are incorporated herein by reference.

TECHNICAL FIELD

This disclosure relates to a power control unit and a battery system including the same.

BACKGROUND ART

In the case where any 12V power supply for keeping a battery system in a wakeup state is not provided in a power unit system that gets power from the battery system, the battery system internally generates power of 12 V, using a battery having a voltage equal to or lower than 100V. Further, power of 12 V generated in this way may be supplied to external systems as well as to the power unit system.

Power of 12 V should be continuously supplied in order to keep the battery system in the wakeup state, whereby leakage current occurs. This is caused by battery discharging, and in order to prevent this, when voltage that is supplied from the battery is equal to or lower than a predetermined threshold voltage, a converter for supplying power of 12 V activates undervoltage-lockout to interrupt consumption current.

After undervoltage-lockout is activated, a charger is connected to the battery to charge the battery. However, since power of 12 V is not supplied to a battery management system, the battery management system cannot wake up. Then, a relay for connecting the charger and the battery is not closed, and therefore, battery charging becomes impossible. In order to prevent this, a separate wake-up circuit for supplying a voltage of 12 V to the battery management system under an undervoltage-lockout condition is required.

Further, depending on battery systems, a charger signal may not be input constantly, but only for a short amount of time (for example, 100 ms). In this case, it should be possible to wake up the battery management system with only a short-time charger signal.

DISCLOSURE

Technical Problem

The present invention has been made in an effort to provide a power control unit and a battery system including the same having advantages of being capable of closing a relay for connecting a charger for charging batteries and a battery when the battery is fully discharged and cannot provide a DC (direct current) power source.

Technical Solution

An exemplary embodiment of the present invention provides a battery system including: a battery pack including a plurality of battery cells connected in series; a battery management system that measures a voltage of each of the plurality of battery cells, and controls charging and discharging of the battery pack; a power converter that generates a direct current (DC) voltage using a voltage of a positive electrode of the battery pack; a power supply unit that generates a power voltage using the voltage of the positive electrode; a regulator that supplies a drive voltage to the battery management system, using the DC voltage; and a power control unit that enables the power converter using the power voltage when it is connected to the power supply unit, in an undervoltage-lockout state of the power converter.

The battery system may further include a switch located between the power supply unit and the power control unit, and is turned on when a charger is connected to the battery system.

The power control unit may include a first latch that outputs the power voltage in sync with a control voltage, the control voltage being generated by the power voltage, and power voltage outputted by the first latch may be supplied to the power converter, and the power converter may be enabled in the undervoltage-lockout state by the power voltage.

The battery management system may reset the first latch when the positive electrode voltage is equal to or greater than a predetermined reference voltage, and the reset first latch may not output the power voltage.

The power control unit may include a comparator that compares the control voltage and a predetermined first reference voltage, and a second latch that supplies a control signal for operating the regulator, using the DC voltage of the power converter, according to the output of the comparator.

The power converter may transition to the undervoltage-lockout state when a voltage on a first contact point connected to the positive electrode of the battery pack is equal to or less than a predetermined threshold voltage, and be enabled by the power voltage supplied from the power control unit in the undervoltage-lockout state.

The power control unit may include a first latch that outputs the power voltage to the first contact point in sync with a control voltage that is generated by the power voltage.

The power control unit may further include a first resistor that has a first end connected to the power supply unit, a second resistor that is connected between a second end of the first resistor and a ground, a third resistor that has a first end connected to the second end of the first resistor, and a capacitor that is connected between a second end of the third resistor and the ground. The control voltage is a voltage on a second contact point at which the second end of the third resistor and the capacitor are connected.

The power control unit may further include a comparator that compares the control voltage with a predetermined first reference voltage, and a second latch that supplies a control signal for operating the regulator using the DC voltage of the power converter, according to the output of the comparator.

Another exemplary embodiment of the present invention provides a power control unit that enables a power converter which is in an undervoltage-lockout state, and includes a first latch that outputs a power voltage in sync with a control voltage that is generated by the power voltage, a comparator that compares the control voltage with a predetermined first reference voltage, and a second latch that outputs a DC voltage of the power converter according to the output of the comparator, wherein the power voltage is generated by a voltage of a positive electrode of a battery pack to which an input terminal of the power converter is connected, and the power converter is enabled by the output of the first latch.

The power control unit may further include a first resistor that has a first end to which the power voltage is supplied, a second resistor that is connected between a second end of the first resistor and a ground, a third resistor that has a first end connected to the second end of the first resistor, and a capacitor that is connected between a second end of the third resistor and the ground. The control voltage is a voltage on a contact point at which the other end of the third resistor and the capacitor are connected.

Advantageous Effects

According to an exemplary embodiment of the present invention, it is possible to provide a power control unit and a battery system including the same capable of activating a battery management system such that a battery can provide a DC power source by a charging signal, without using any external physical switch, even under an undervoltage-lockout condition attributable to battery discharging.

Even if the charging signal is supplied for a short time, according to the present invention, the battery system can activate the battery management system such that it is possible to provide a DC power source.

DESCRIPTION OF THE DRAWINGS

FIG. 1 is a drawing schematically illustrating a battery system according to an exemplary embodiment.

FIG. 2 is a drawing illustrating the configuration of a power control unit according to an exemplary embodiment.

MODE FOR INVENTION

As used herein, the suffix 'module' and/or the suffix 'unit' for constituent elements are given and used interchangeably in consideration of only ease of preparing this specification, and the suffixes themselves do not have meanings or roles distinguishable from each other. In addition, terms such as "-er", "-or", and "module" described in the specification mean units for processing at least one function or operation, and can be implemented by hardware or software, or by combinations of hardware and software.

Further, when describing exemplary embodiments disclosed in this specification, detailed descriptions of publicly known technologies will be omitted if it is determined that specific description thereof may obscure the gist of the exemplary embodiments disclosed in this specification. Furthermore, the accompanying drawings are provided for helping to easily understand exemplary embodiments disclosed in the present specification, and the technical spirit disclosed in the present specification is not limited by the accompanying drawings, and it will be appreciated that the present invention includes all of the modifications, equivalent matters, and substitutes included in the spirit and the technical scope of the present invention.

Terms including an ordinal number, such as first and second, are used for describing various constituent elements, but the constituent elements are not limited by the terms. The terms are used only to discriminate one constituent element from another constituent element.

When a constituent element is referred to as being "connected" or "coupled" to another constituent element, it will be appreciated that it may be directly connected or coupled to the other constituent element or intervening other constituent elements may be present. In contrast, when a constituent element is referred to as being "directly connected" or "directly coupled" to another constituent element, it will be appreciated that there are no intervening other constituent elements present.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

FIG. 1 is a drawing schematically illustrating a battery system according to an exemplary embodiment.

In FIG. 1, between two output terminals P+ and P− of a battery system 1, an external device 2 is connected, and when relays 21 and 22 are closed, a battery pack 10 and the external device 2 can be electrically connected.

In the case where the external device 2 is an automotive electric load, the battery system 1 may operate as a power source for supplying energy to the automotive electric load 2, thereby being discharged. The automotive electric load may be a transportation means or an energy storage system (ESS), and the transportation means may be, for example, an electric vehicle, a hybrid vehicle, or smart mobility. In the case where the external device 2 is a charger, the battery system 1 may get energy from a power system through the charger 2, thereby being charged.

The battery system 1 includes the battery pack 10, the two relays 21 and 22, a current sensor 23, and a battery management system 20.

The battery pack 10 includes a plurality of battery cells 10_1 to **10_*n* (wherein n is a natural number equal to or greater than 2) connected in series. FIG. 1 shows that the battery pack 10** is connected in series; however, this is merely an example, and the present invention is not limited thereto. For example, a plurality of sets of battery cells connected in parallel may be connected in series.

The relay 21 is connected between the positive electrode P1 of the battery pack 10 and the output terminal P+, and the relay 22 is connected between the negative electrode of the battery pack 10 and the output terminal P−, and opening and closing of the relays 21 and 22 may be controlled by control of the battery management system 20. For example, the battery management system 20 may generate enable-level relay control signals SR1 and SR2, and transmit them to the relays 21 and 22. Then, the relays 21 and 22 can be closed by the enable-level relay control signals SR1 and SR2. Further, the battery management system 20 may generate disable-level relay control signals SR1 and SR2, and transmit them to the relays 21 and 22. Then, the relays 21 and 22 can be opened by the disable-level relay control signals SR1 and SR2. During charging or discharging of the battery pack 10, the relays 21 and 22 may be closed to form a charging current path or a discharge current path.

The current sensor 23 may detect current flowing in the battery pack 10, and transmit a current detection signal IS indicating the detected current to the battery management system 20.

The battery management system 20 may be connected to the plurality of battery cells 10_1 to **10_*n*, and control charging/discharge current of the battery pack 10 on the basis of information such as the cell voltage of each of the plurality of battery cells 10_1 to 10_*n* and the battery current of the battery pack 10, thereby controlling a cell balancing operation on the plurality of battery cells 10_1 to 10_*n***.

The battery system 1 may further include a power supply unit 30, a power converter 40, a regulator 50, and a power control unit 60. Between the power supply unit 30 and the power control unit 60, a switch 3 is connected.

The switch 3 is switched depending on at least one of the connection state of the external device 2 and the battery system 1 and the operation state of the external device 2.

The switch 3 may be switched depending on whether the external device 2 and the battery system 1 are connected or not. For example, when the external device 2 is connected between both output terminals P+ and P− of the battery system 1, the switch 3 may be switched on.

The switch 3 may be switched depending on a signal for controlling the operation of the external device 2. For example, when the signal for controlling the operation of the external device 2 transitions to an ON level, the switch 3 may also be turned on. In contrast, when the signal for controlling the operation of the external device 2 transitions to an OFF level, the switch 3 may also be turned off.

In the case where the external device 2 in this disclosure is a charger 2, the switch 3 may be turned on when the charger 2 is connected between the two output terminals P+ and P−. Alternatively, the switch 3 may be turned on when a charging signal ON_S for controlling the operation of the charger 2 is at an ON level which is a level for instructing to charge, and be turned off when the charging signal ON_S is at an OFF level which is a level for ending charging. Although FIG. 1 shows that the switch 3 is separate from the external device 2, the switch may be located inside the external device 2. In FIG. 1, the charging signal ON_S which is an example of a signal for controlling the switching operation of the switch 3 may be provided from the external device 2 which is a charger to the switch 3.

The power supply unit 30 may be connected to the positive electrode P1 of the battery pack 10, and generate power voltage VW1 depending on the voltage of the positive electrode P1 of the battery pack 10. The power voltage VW1 may be used as a drive voltage for the power control unit 60. A voltage required for the power control unit 60 to operate is referred to as a drive voltage. When the external device 2 is turned on, the power voltage VW1 can be transmitted as a start signal SS to the power control unit 60 through the switch 3 which is in the ON state.

The power converter 40 generates DC voltage VDC using the voltage of the positive electrode P1. The power converter 40 may be implemented with a buck converter. The power converter 40 may control undervoltage-lockout on the basis of the voltage on a contact point N_EN at which two resistors R1 and R2 are connected. For example, when the voltage on the contact point N_EN is equal to or lower than a predetermined first threshold voltage, the power converter 40 does not operate due to the undervoltage-lockout control operation. The power converter 40 may be enabled to undo the undervoltage-lockout when the voltage on the contact point N_EN is higher than a predetermined second threshold voltage. When enabled, the power converter 40 may generate DC voltage VDC using the voltage of the positive electrode P1 of the battery pack 10. The DC voltage VDC generated by the power converter 40 may be used as a drive voltage required for the operation of the battery system 1.

The regulator 50 starts operating in response to a control signal SC of the power control unit 60, and supplies a drive voltage VS required for the operation of the battery management system 20.

When the external device 2 starts operating, the power control unit 60 may activate the power converter 40 and the regulator 50 on the basis of a control signal SS supplied from the power supply unit 30.

Hereinafter, the charging operation according to the exemplary embodiment will be described in detail with reference to FIG. 2.

FIG. 2 is a drawing illustrating the configuration of the power control unit according to the exemplary embodiment.

In FIG. 2, the power supply unit 30 includes two resistors R3 and R4, a voltage follower 31, and a diode 32. The configuration of the power supply unit 30 shown in FIG. 2 is an example, and the present invention is not limited thereto. The power supply unit 30 needs only to be able to generate a power source using the voltage of the positive electrode P1 of the battery pack 10 at ordinary times. For example, the power supply unit 30 may be implemented with a general regulator. The regulator may receive the voltage of the positive electrode P1 of the battery pack 10 and generate a constant-voltage power source.

The two resistors R3 and R4 are used to obtain a fraction of the voltage of the positive electrode P1. The voltage follower 31 may receive the fraction of the voltage and output it. The anode of the diode 32 is connected to the output terminal of the voltage follower 31, and the cathode of the diode 32 is connected to one terminal of the switch 3. The diode 32 can prevent the configuration of the battery system 1 from being damaged by short-circuit of the switch 3.

In the exemplary embodiment shown in FIG. 2, the external device 2 will be described as a charger. When charging starts, the switch 3 may be turned on in response to an ON-level charging signal ON_S supplied from the external device 2 to the switch 3. Through the switch 3 in the ON state, the start signal SS is supplied from the power supply unit 30 to the power control unit 60. The start signal SS may be at the same level as that of the power voltage VW1.

The other terminal of the switch 3 is connected to one end of a resistor R5, and the other end of the resistor R5 is connected to one end of a resistor R6 and one end of a resistor RD. The other end of the resistor R6 is connected to a ground, and the other end of the resistor RD is connected to the input of a comparator 61. One end of a capacitor CD is connected to the input of the comparator 61, and the other end of the capacitor CD is connected to the ground.

The start signal SS that is supplied while the switch 3 is on is distributed by the two resistors R5 and R6. The start signal SS has a voltage level depending on the power voltage VW1, and may have the same level as that of the power voltage VW1. The capacitor CD may be charged by the voltage obtained by distributing the start signal SS by the two resistors R5 and R6, whereby control voltage VW2 can increase. The minimum ON-level duration of the charging signal ON_S may be determined such that the control voltage VW2 can increase to a predetermined voltage. At this time, the minimum ON-level duration of the charging signal ON_S may be determined in consideration of the resistance value of the resistor RD and the capacitance of the capacitor CD. The resistor RD and the capacitor CD may serve as a noise filter, thereby preventing malfunction attributable to noise of the start signal SS.

As shown in FIG. 2, the power control unit 60 includes the comparator 61 and two latches 62 and 63.

The comparator 61 may compare the control voltage VW2 with a predetermined reference voltage, and generate an ON-level (for example, high-level) output signal when the control voltage VW2 is equal to or higher than the reference voltage.

The latch 63 may enable the power converter 40 in sync with occurrence of the control voltage VW2. The latch 63 receives the power voltage VW1, and supplies the power voltage VW1 to the contact point N_EN according to the control voltage VW2 generated after turning on of the switch 3. Then, the power converter 40 can be enabled.

The power converter 40 is enabled, and generates the DC voltage VDC, and the DC voltage VDC is supplied to the latch 62.

The latch 62 may generate the control signal SC for activating the regulator 50, when the output signal of the comparator 61 is at the ON level. At this time, the level of the control signal SC may be determined depending on the DC voltage VDC supplied from the power converter 40.

The regulator 50 starts operating when the control signal SC is at the ON level. The regulator 50 converts the DC voltage VDC into a constant voltage, thereby generating the drive voltage VS, and supplies it to the battery management system 20.

The battery management system 20 starts operating in response to the drive voltage VS, and closes the relays 21 and 22. Then, the battery pack 10 is charged, whereby the voltage of the positive electrode P1 rises. If the voltage of the positive electrode P1 rises to a normal range by charging of the battery pack 10, the battery management system 20 may generate a sleep signal SE, and supply it to the latch 63. The latch 63 may be reset by the sleep signal SE so as not to supply the power voltage VW1 to the contact point N_EN.

In the related art, when an undervoltage-lockout function is activated, even if an external device starts operating, a situation where a DC voltage required for a battery system to operate is not supplied is maintained. For example, even if a charger is connected to the battery system in order to charge the battery system, a relay between the battery system and the charger cannot be closed, so the battery system is not charged. In order to remedy this situation, a method in which an external physical switch for enabling a battery system is connected to the battery system has been proposed. However, in this case, there is an inconvenience that a worker needs to operate the switch.

In contrast, the battery system according to the exemplary embodiment can enable the power converter 40 which is in the undervoltage-lockout state, automatically, without any worker's action, when a signal for operating the external device 2 like the charging signal is generated. Further, since the battery system according to the exemplary embodiment uses the latch 63 to enable the power converter 40, the power converter 40 can be enabled even by a charging signal which is an ON-level pulse, not a continuous ON-level signal. In other words, if the control voltage VW2 is generated by the charging signal which is an ON-level pulse, the output of the latch 63 is maintained at the power voltage VW1. Therefore, the power voltage VW1 can be supplied to the contact point N_EN.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A battery system comprising:

a battery pack including a plurality of battery cells connected in series;

a battery management system that measures a voltage of each of the plurality of battery cells, and controls charging and discharging of the battery pack;

a power converter that generates a direct current (DC) voltage using a voltage of a positive electrode of the battery pack;

a power supply unit that generates a power voltage using the voltage of the positive electrode;

a regulator that supplies a drive voltage to the battery management system, using the DC voltage; and a power control unit that enables the power converter using the power voltage when it is connected to the power supply unit in an undervoltage-lockout state of the power converter.

2. The battery system of claim 1, further comprising:

a switch located between the power supply unit and the power control unit, and being turned on when a charger is connected to the battery system.

3. The battery system of claim 1, wherein:

the power control unit includes a latch that outputs the power voltage in sync with a control voltage, the control voltage being generated by the power voltage, and the power voltage outputted by the latch is supplied to the power converter, and the power converter is enabled in the undervoltage-lockout state by the power voltage.

4. The battery system of claim 3, wherein:

the battery management system resets the latch when the voltage of the positive electrode is equal to or greater than a predetermined reference voltage, and the reset latch does not output the power voltage.

5. The battery system of claim 1, wherein:

the power control unit includes:

- a comparator that compares the control voltage and a predetermined first reference voltage; and
- a latch that supplies a control signal for operating the regulator, using the DC voltage of the power converter, according to the output of the comparator.

6. The battery system of claim 1, wherein:

the power converter transitions to the undervoltage-lockout state when a voltage on a first contact point connected to the positive electrode of the battery pack is equal to or less than a predetermined threshold voltage, and is enabled by the power voltage supplied from the power control unit in the undervoltage-lockout state.

7. The battery system of claim 6, wherein:

the power control unit includes a first latch that outputs the power voltage to the first contact point in sync with a control voltage that is generated by the power voltage.

8. The battery system of claim 7, wherein:

the power control unit further includes:

- a first resistor that has a first end connected to the power supply unit;
- a second resistor that is connected between a second end of the first resistor and a ground;

a third resistor that has a first end connected to the second end of the first resistor; and a capacitor that is connected between a second end of the third resistor and the ground, and the control voltage is a voltage on a second contact point at which the second end of the third resistor and the capacitor are connected.

9. The battery system of claim 7, wherein:

the power control unit further includes:

a comparator that compares the control voltage with a predetermined first reference voltage; and a second latch that supplies a control signal for operating the regulator using the DC voltage of the power converter, according to the output of the comparator.

10. A power control unit that enables a power converter which is in an undervoltage-lockout state, the power control unit comprising:

a first latch that outputs a power voltage in sync with a control voltage that is generated by the power voltage;

a comparator that compares the control voltage with a predetermined first reference voltage; and a second latch that outputs a direct current (DC) voltage of the power converter according to the output of the comparator, wherein the power voltage is generated by a voltage of a positive electrode of a battery pack to which an input terminal of the power converter is connected, and the power converter is enabled by the output of the first latch.

11. The power control unit of claim 10, wherein:

the power control unit further includes:

a first resistor that has a first end to which the power voltage is supplied;

a second resistor that is connected between a second end of the first resistor and a ground;

a third resistor that has a first end connected to the second end of the first resistor; and a capacitor that is connected between a second end of the third resistor and the ground, and the control voltage is a voltage on a contact point at which the second end of the third resistor and the capacitor are connected.

* * * * *